Oct. 30, 1923.

R. H. COMSTOCK

FLOWERPOT HANDLE

Filed Nov. 28, 1922

1,472,461

INVENTOR
Roger H. Comstock
BY
Wooster & Davis
ATTORNEYS.

Patented Oct. 30, 1923.

1,472,461

UNITED STATES PATENT OFFICE.

ROGER H. COMSTOCK, OF MILFORD, CONNECTICUT.

FLOWERPOT HANDLE.

Application filed November 28, 1922. Serial No. 603,779.

*To all whom it may concern:*

Be it known that I, ROGER H. COMSTOCK, a citizen of the United States, residing at Milford, county of New Haven, State of Connecticut, have invented an Improvement in Flowerpot Handles, of which the following is a specification.

This invention relates to handles for flower pots of the type disclosed in my prior Patent No. 1,369,965, issued March 1, 1921, and has for an object to provide a handle of this type which may be applied to pots of different sizes.

It is also an object of the invention to provide an improved type of a band in this type of handle for embracing the pot.

With the foregoing and other objects in view I have devised the construction illustrated in the accompanying drawing, in which—

Figure 1:
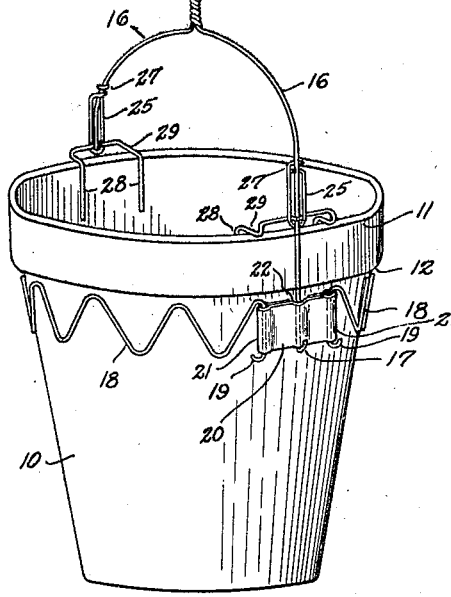
Fig. 1 is a perspective view of a flower pot showing my improved handle applied thereto.

A conventional clay flower pot is shown at 10 having the usual enlarged rim 11 at the upper edge thereof providing a shoulder 12 and the lower body part being tapered, as shown. My improved handle preferably comprises any desired number of wires twisted together to form an upright 13 with a handle loop 14 at the upper end bent in the center of the upper portion thereof at 15 to provide means when the handle is suspended from a hook to prevent the handle sliding sidewise thereon. At the lower end of the upright the wires are separated to provide downwardly extending curved arms 16 having hooks 17 at their lower ends. In the embodiment illustrated I have shown two arms and this number is sufficient for certain sizes of pots, but for large pots, or for pots having unusually large plants to be supported I may employ more arms, as three or four, which will obviously supply a more rigid support and retain it more securely in upright position. This upright is designed not only as a handle for carrying and supporting the pot, but it is also intended to be used as a stake or a support to which a plant in the pot may be tied to hold it upright.

Secured to the lower ends of the arms and embracing the pot is a band preferably composed of wire 18 bent to a zig-zag shape, as shown, the wire extending transversely of the band so as to provide a suitable bearing surface on the outer surface of the pot. It will be apparent the general effect is to provide a thin flat band, but one which will yield lengthwise of the wire or peripherally of the band, and if the wire is made resilient it will automatically clamp about the surface of the pot. It has been found in practice that the pots vary considerably in size, that is a pot designated as a six inch pot may vary anywhere from 5½ to 6½ inches in diameter and where a flat sheet metal band is employed with no means for allowing variations in the diameter thereof, it assumes various positions on the outer surface of the pot spoiling the appearance thereof. By making the band of wire zig-zag as shown, the band may yield and be varied in size so as to always grip the pot immediately under the shoulder 12, and thus the handle will always be properly positioned relative to the pot.

Figure 2:
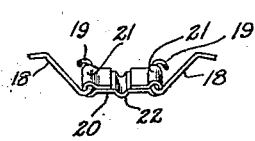
Fig. 2 is a detailed perspective view showing a connecting element for the sections of the band and means for connecting the same to the arms of the handle.

Different means may be employed for securing together the ends of the wire forming the band or for securing it to the handles. I prefer a construction substantially that shown in Figs. 1 and 2 in which the ends of the sections of the wire forming the band are provided with hooks 19, and a connection 20 comprising a piece of flat sheet metal looped at its ends, as shown at 21, about the wires adjacent the hooks 19 to secure the same thereto. This band is preferably beaded intermediate its ends, as shown at 22, to receive the arms 16 and allow the lower edge of this connection to seat in the hooks 17.

Figure 3:
Fig. 3 is a plan view of a section of a band showing a slightly different construction.
Figure 4:
Fig. 4 is a front elevation thereof looking from the bottom of Fig. 3.

In Figs. 3 and 4 I have shown a slightly different construction in which the band may be made of a continuous piece of wire 23 bent to zig-zag shape as in the first form, and in which the free ends may be secured together by soldering or welding. For connecting the band to the arms 16 it is provided with suitable loops 24 to receive the arms 16 and rest in the hooks 17.

Figure 6:
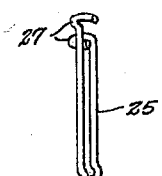
Fig. 6 is a perspective view of the upper element of this clip.
Figures 5, 7:
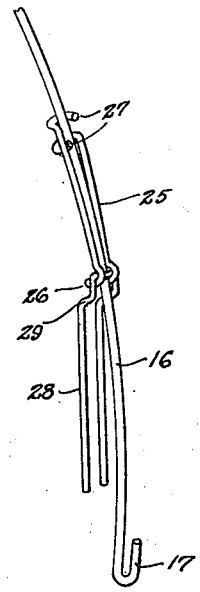
Fig. 5 is a perspective view of the clip on the arm for engaging the top edge of the pot.
Fig. 7 is a perspective view of the lower element of the clip.

The clips shown in Figs. 5, 6 and 7 are the same as those disclosed in my prior patent above mentioned and engage the arms 16 and the rim of the pot to rigidly support the arms in upright position. The upper element 25 comprises a piece of wire bent laterally intermediate its ends, as shown at 26, and with hooks 27 at the ends thereof. The lower element 28 is substantially U-shaped with an offset 29 at its upper end. In applying the clip to the arms 16 the upper element is placed with the lateral bend 26 resting on the rim of the pot and with arm 16 seated in the same with the hooks 27 spaced outwardly from the arms. The lower element 28 is then placed between the same and the arm on top of the bend with the legs of this element extending on the inside of the pot. The hooks 27 are then forced inwardly to engage the arm 16 as shown, securely connecting these elements to the arm and the pot, and holding the arms in upright position.

It will be apparent from the foregoing description that the construction described will provide a very simple and neatly appearing flower pot handle which may be easily and quickly applied and removed from the pot, and will be rigidly held in upright position to support a plant growing within the pot. Also that the zig-zag construction of band for embracing the pot will allow variation in the diameter of this band to fit variations in the sizes of the pots, so that this band may always embrace the same immediately under the shoulder 12 which is the most desirable location for this band. This gives a uniform location of the handles and a much neater appearance.

Having thus set forth the nature of my invention, what I claim is:

1. A flower pot handle comprising downwardly extending arms provided with hooks at their lower ends, and a ring adapted to embrace a flower pot and engaged by said hooks, said ring comprising a ziz-zag wire.

2. A flower pot handle comprising downwardly extending arms, a ring adapted to embrace a pot and comprising a zig-zag wire, and means for securing the ring to the arms.

3. A flower pot handle comprising downwardly extending arms, a ring adapted to embrace a pot and comprising a plurality of sections made of wire bent to zig-zag shape, means for connecting the sections together comprising straps embracing the end portions of the wires, and said arms being provided with means for connecting them to said straps.

4. A flower pot handle comprising downwardly extending arms, a ring adapted to embrace a pot and comprising a plurality of sections made of wire bent to zig-zag shape and having hooks at their ends, means for connecting the sections comprising sheet metal straps embracing the wires adjacent the hooks, and means for connecting the arms to said straps.

5. A flower pot handle comprising downwardly extending arms provided with hooks at their lower ends, a ring adapted to embrace a flower pot and comprising a plurality of sections of wire bent to zig-zag shape, means connecting the sections comprising sheet metal straps embracing the wires adjacent their ends and beaded intermediate their ends to receive the said arms and seated at their lower edges in said hooks.

6. A flower pot handle comprising downwardly extending arms, a ring adapted to embrace a pot and comprising a zig-zag wire, means for securing the ring to the arms, and clips adapted to engage the arms and the edge of the pot and hold the arms in upright position.

7. A flower pot handle having downwardly extending arms provided with hooks at their lower ends, a ring adapted to embrace a pot and comprising a plurality of sections made of wire bent to zig-zag shape and having hooks at their ends, sheet metal straps embracing the wires adjacent said hooks and beaded intermediate their lengths to receive said arms and also adapted to seat in the hooks of said arms, and clips adapted to engage said arms and the upper edge of the pot to secure the arms in upright position.

8. A flower pot handle having downwardly extending arms, a continuous ring adapted to embrace a pot, said ring being resilient and adapted to yield peripherally of the ring to compensate for variations in the pots, and means for connecting the arms to said ring.

In testimony whereof I affix my signature.

ROGER H. COMSTOCK.